Patented Nov. 29, 1949

2,489,423

UNITED STATES PATENT OFFICE 2,489,423

THE COMPOUND 4-CHLORO-3-TRIFLUOROMETHYLPHENOL AND METHOD OF PREPARATION

Elmer J. Lawson, East Greenbush, and Chester M. Suter, Albany, N. Y., assignors to Sterling Drug Inc., New York, N. Y., a corporation of Delaware No Drawing. Application January 15, 1949, Serial No. 71,217

2 Claims. (Cl. 260—623)

This invention relates to 3-trifluoromethyl-4-chlorophenol and to the preparation thereof.

It is an object of this invention to provide a new and highly effective agent for combatting objectionable parasitic organisms.

We have prepared the new substance, 3-trifluoromethyl-4-chlorophenol, which has the formula

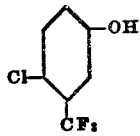

and we have found that it is a strong antifungal agent, having a high degree of fungistatic activity, and that it also is an effective and satisfactory anthelmintic.

For example, as an antifungal agent, it can be employed in dilute alcoholic or dilute aqueous alkaline solutions or in the form of a solid powder when mixed with an inert extender such as talc. For use as an anthelmintic, we prefer to employ it in solution in an oil such as sesame oil, or where purgative action is also desired, in castor oil.

The preparation of 3-trifluoromethyl-4-chlorophenol according to our invention is carried out by diazotizing 3-trifluoromethyl-4-chloroaniline and heating the resulting diazonium salt, which is preferably the diazonium sulfate, with water or with aqueous sulfuric acid. For the diazotization step, it is convenient to employ sodium nitrite and sulfuric acid, since the preferred diazonium sulfate is thus produced. The reactions involved are illustrated by the following equations:

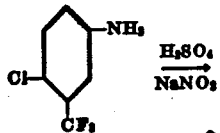

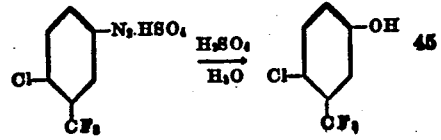

Our invention is illustrated by the following preparation without, however, being limited thereto.

Example 80.5 g. of 2-chloro-5-aminobenzotrifluoride was added to a stirred solution of 72 ml. of concentrated sulfuric acid and 570 ml. of water at 60–70° C. This solution was then cooled to 0–5° C. with stirring to give a homogeneous suspension. To this suspension there was added a solution of 31.3 g. of sodium nitrite in 50 ml. of water at such a rate that the temperature did not rise above 5° C., external cooling being used. After the addition was complete, the reaction mixture was stirred for one hour at 0–5° C. The reaction mixture was then added dropwise to 300 ml. of 25% sulfuric acid contained in a steam distillation apparatus. The product was steam distilled as it was formed, about four liters of distillate being collected. This distillate was extracted with ether and the ether solution thus obtained was distilled. After removal of the ether, distillation of the residue gave 59 g. of product boiling at 119–126° C. (27 mm.). Redistillation of the product gave 55 g. of 4-chloro-3-trifluoromethylphenol, B. P. 120–122° C. (27 mm.), $n_D^{25}$ 1.4928, M. P. 43° C.

We claim:

1. 4-chloro- 3 - trifluoromethylphenol, having the formula

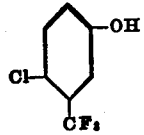

2. The process which comprises diazotizing 3-trifluoromethyl-4-chloroaniline and heating the resulting diazonium salt with aqueous sulfuric acid.

ELMER J. LAWSON.
CHESTER M. SUTER.

No references cited.